United States Patent [19]

Bright

[11] 3,978,758

[45] Sept. 7, 1976

[54] BOLT AND PROCESS OF FORMING SAME

[76] Inventor: William L. Bright, 0605 SW. Curry St., Portland, Oreg. 97201

[22] Filed: May 29, 1975

[21] Appl. No.: 581,879

Related U.S. Application Data

[63] Continuation of Ser. No. 459,945, April 11, 1974, abandoned.

[52] U.S. Cl. .................................. 85/9 R; 10/27 R
[51] Int. Cl.² ..................... B21K 1/46; F16B 23/00
[58] Field of Search ............... 10/10 R, 27 R, 27 H; 85/1 R, 9 R, 9 W

[56] References Cited
UNITED STATES PATENTS

| | | | |
|---|---|---|---|
| 469,261 | 2/1892 | Moran | 10/27 R |
| 1,346,058 | 7/1920 | Robergel | 10/27 R |
| 1,435,586 | 11/1922 | Collette | 10/27 R |
| 1,742,201 | 1/1930 | Drissner | 10/27 R |
| 1,765,516 | 6/1930 | Whitney | 10/27 R |
| 3,517,402 | 6/1970 | Cohen | 10/27 R |
| 3,783,462 | 1/1974 | Steffan | 10/27 H |
| 3,828,382 | 8/1974 | Nakamura | 10/27 R |

FOREIGN PATENTS OR APPLICATIONS

| | | | |
|---|---|---|---|
| 156,467 | 1/1903 | Germany | 10/27 R |
| 674,886 | 4/1939 | Germany | 10/27 R |
| 857,149 | 7/1949 | Germany | 10/27 R |

*Primary Examiner*—C.W. Lanham
*Assistant Examiner*—E. M. Combs
*Attorney, Agent, or Firm*—Eugene M. Eckelman

[57] ABSTRACT

An auxiliary head with a peripheral wrench surface is secured on a body member of a type having a threaded shank, a head, and lateral projecting means adjacent the bottom of the head which extend out beyond the outer dimension of the threads on the shank. Such auxiliary head has an axial opening which is larger than the threaded shank so as to receive the latter but is dimensioned at least in some portions thereof relative to the projecting dimension of the lateral projecting means such that securement of the two parts is accomplished by forcing the auxiliary head up against the bottom of the head of the body member onto the lateral projecting means in a press fit or in a broached connection.

3 Claims, 9 Drawing Figures

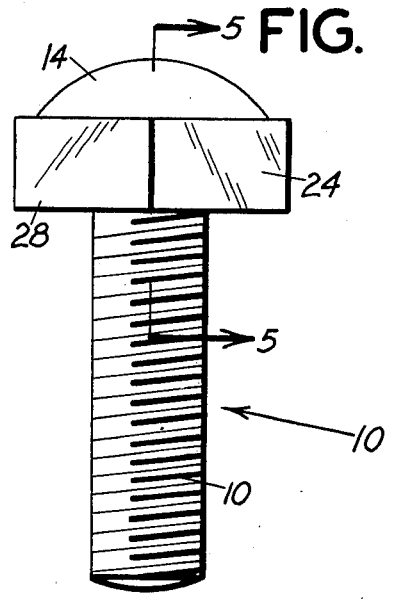
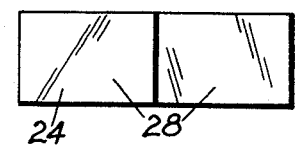
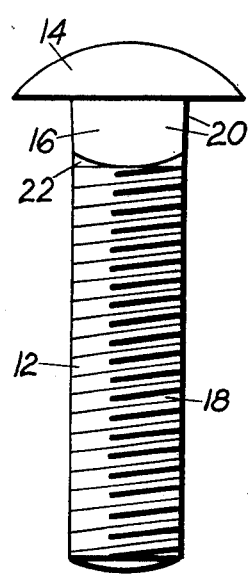
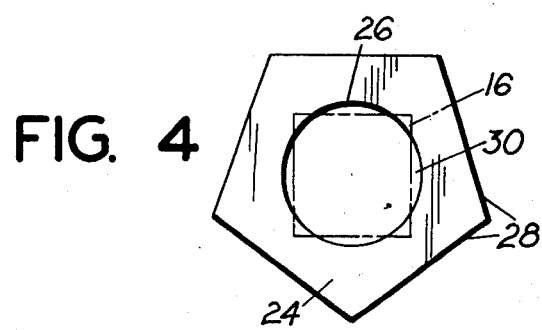
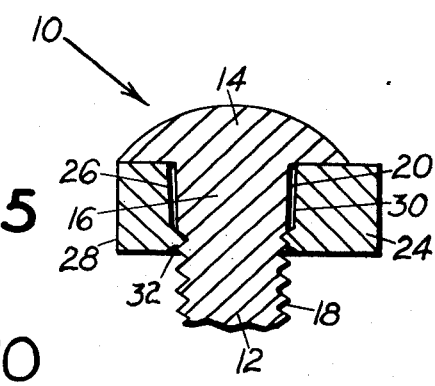
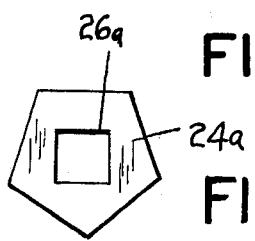
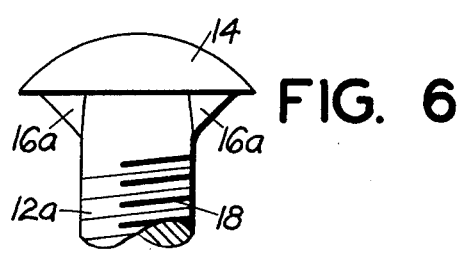
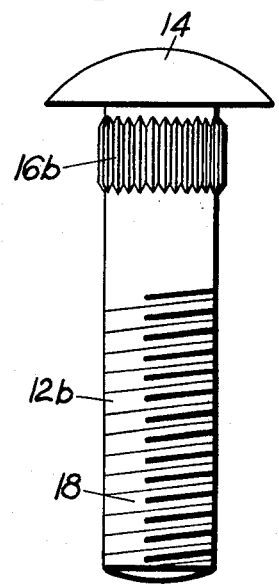
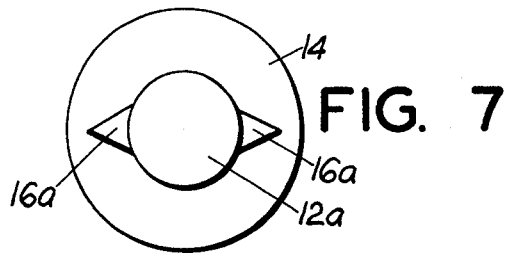
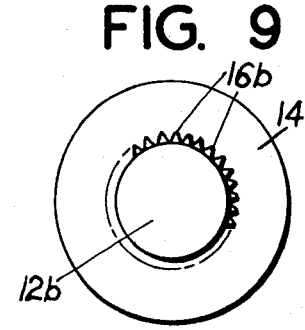

BOLT AND PROCESS OF FORMING SAME

This is a continuation, division, of application Ser. No. 459,945 filed April 11, 1974, now abandoned.

BACKGROUND OF THE INVENTION

This invention relates to new and useful improvements in bolt constructions and to a process of forming the same.

Several processes of producing bolts have heretofore been used. One process comprises forming the bolts in screw machines. This involves utilizing a metal bar of outside dimensions equivalent to the outside dimensions of the finished bolt head. The metal bar is rotated in the screw machine and tools contacting the rotating bar cut away the material under the head to form a bolt shank of a desired diameter. After other tools cut threads on the shank, the bolt is then cut away from the rotating bar. The screw machine process has several disadvantages, namely, it is relatively slow and expensive, it produces a great amount of scrap metal, and the grain of the metal in the bolt as formed is weakened due to the lateral cutting thereof at the base of the head.

Another process of producing bolts comprises the hot heading process. It consists of forcing heated metal into dies to form the desired shape. The utilization of dies for withstanding the high temperatures necessary and the necessity of providing equipment for producing such temperatures in the process makes for greater costs and complications.

Still another process of producing bolts and the one mostly used is the cold heading process. This process involves a system of stationary and movable dies utilizing round stock of a diameter to suit the finished thread diameter of the bolt shank. The stationary die has a center hole which accepts the round stock of the exact length required. A pre-set movable pin inside the stationary die allows the round stock to travel into the die the exact distance required for the desired length of the bolt shank, leaving the exact length of round stock protruding from the die to form the bolt head or upset. The head is formed by one or more movable dies forming the round stock into the desired shape. The bolt in rivet form is then ejected from the stationary die and threads are then rolled or cut into the bolt shank.

Although the cold heading process is the most economical, it has the limitation that the upset limit should not be greater than 4½ diameters of stock; that is, the volume limit to form the upset in terms of length of stock cannot exceed 4½ times the diameter of the stock. If the ratio of upset is greater than this recommended amount, the efficiency of the cold heading process is defeated, and when it is desired that bolts have enlarged or thickened heads, they must be formed by other processes which as stated above have undesirable features.

All of the processes for forming bolts have a further disadvantage in that it is not possible or at least it is not economically feasible to provide a head of different material than the metal in the shank. Such combinations of metal or material may be desired in certain fastener applications.

SUMMARY OF THE INVENTION

According to the present invention and forming a primary objective thereof, a bolt construction and process are provided which make feasible the formation of bolts by the cold heading process outside the recommended ratio of upset in relation to the length of stock and which also make it possible to economically produce bolts wherein a head portion and shank are of different metal.

A more particular object of the present invention to accomplish the desired advantages is to provide a bolt formed from two pieces comprising a bolt-type body member and an auxiliary head or blank portion, the auxiliary head having a peripheral wrench surface and also having an axial opening into which a non-threaded enlarged shank portion adjacent the head of the body member is secured as by a press fit or by broaching. By means of this structure, the auxiliary head is locked integrally and non-rotatably on the body member to provide the head assembly.

Another object is to provide a bolt construction of the type described wherein the auxiliary head may overlap threaded portions of the shank of the body member and the bottom of the auxiliary head is swaged inwardly to fill areas in the threads of the shank and securely lock the auxiliary head against movement away from the head of the body and also to increase the twisting strength of the bolt.

The invention will be better understood and additional objects and advantages will become apparent from the following description taken in connection with the accompanying drawings.

BRIEF DESCRIPTION OF THE DRAWINGS

FIG. 1 is an elevational view of a bolt illustrating the present invention;

FIG. 2 is an elevational view of a body member forming one part of the bolt;

FIGS. 3 and 4 are elevation and plan views, respectively, of an auxiliary head which together with the body member shown in FIG. 2 form one embodiment of the present bolt construction;

FIG. 5 is a fragmentary sectional view taken on the line 5—5 of FIG. 1;

FIG. 6 is a fragmentary elevational view of another type of body member for the present bolt;

FIG. 7 is a bottom plan view of the body member of FIG. 6;

FIG. 8 is an elevational view of still another type of body member for the present bolt;

FIG. 9 is a bottom plan view of the body member of FIG. 8; and

FIG. 10 is a plan view in reduced scale of a modified form of auxiliary head.

With reference particularly to FIG. 2, the bolt 10 utilizes a bolt-type body member 12 having a head 14 and a shank consisting of a square unthreaded portion 16 adjacent to the head and a threaded portion 18. The side walls 20 of the unthreaded portion 16 of the shank are tapered slightly to a lesser dimension in the direction away from the head and have additional tapered or chamfered portions 22 adjacent the bottom thereof. The tapered walls 20 facilitate removal of the bolt from the die in its formation and such taper is useful in carrying out the invention as will be more apparent hereinafter. It is apparent that body member 12 comprises a conventional round head square neck carriage bolt.

The embodiment of FIG. 1 combines the body member 12 of FIG. 2 with an auxiliary head or blank 24, the latter being shown apart from the body member in FIGS. 3 and 4. This auxiliary head comprises a thickened plate-like member provided with a central axial opening 26 therethrough and a peripheral wrench surface 28 which may be of conventional shape such as square or hexagonal or of non-conventional shape such as pentagonal as shown.

The opening 26 has a diameter slightly larger than the diameter of shank 18 so that the auxiliary head can receive the shank portion 18 of the body member 12. Such diameter is less, however, than the diagonal dimension of the unthreaded shank portion 16. The bolt 10 is formed by inserting the shank 18 of the body member into the opening 26 in the auxiliary head 24 and driving the unthreaded shank portion forcefully as in a broaching step into the auxiliary head to a point where the latter securely abuts against the underside of head 14 as shown in FIGS. 1 and 5. The general dimensional relationship of the opening 26 and the unthreaded shank portion 16 is shown in FIG. 4, the shank portion 16 being shown in phantom lines. Upon these two members being driven together, the corners of the shank portion will bite into areas of the auxiliary head outwardly of the opening 26. Some of the metal will move into areas 30 between the opening 26 and the sides of the shank portion 16. The slight taper of the walls 20, as well as the tapers 22, facilitate the penetration of the shank portion 16 into the auxiliary head.

The connection of the auxiliary head 24 to the shank portion 16 provides an integral non-rotating connection. To further integrate the auxiliary head on the body member, the threads on the shank portion extend fully up to the unthreaded shank portion 16, and the auxiliary head is made of a greater thickness than the length of such unthreaded shank portion 16. The bottom of the auxiliary head can thus be swaged inwardly to provide an inturned portion 32 of metal from the auxiliary head extending into the threads of the shank portion 18. Preferably, this swaged portion extends all the way around the shank and may be accomplished by an annular swage projection on the driving tool or anvil utilized for forcing the two members together. The swaging 32 prevents the auxiliary head from moving axially down the shank of the bolt.

FIGS. 6–9 illustrate other forms of bolt-type body members and serve to illustrate the principle that the broach connection between the body member and the auxiliary head may be accomplished with various types of projections on the unthreaded shank portion of the body member other than the square shank portion of FIG. 2. For example, the body member 12a of the embodiment of FIGS. 6 and 7 may comprise a bolt conventionally known as a round head fin neck bolt having diametrically disposed radial projections 16a under the head adapted to be secured to an auxiliary head 24 of the structure shown in the FIG. 1 embodiment and in the same way. Likewise, a body member 12b as shown in the embodiment of FIGS. 8 and 9 may comprise a bolt conventionally known as a round head ribbed neck bolt, the ribbed neck portion 16b cutting into the auxiliary head in the same manner as the previous embodiments to provide the connection between the body member and the auxiliary head.

The embodiment of FIGS. 8 and 9 illustrates also that the threads of the body member need not extend up to the projecting or connecting portion of the body member since an adequate connection for the intended purpose between the body member and the auxiliary head may be provided without the use of swaging which was illustrated by the reference numeral 32 in FIG. 5, although a more secure connection is of course provided if the swaging is used.

FIG. 10 shows an auxiliary head embodiment 24a wherein the opening 26a therethrough is square. Such opening is dimensioned relative to the unthreaded shank portion 16 of the body member 12 such that the head 24a merely has a press fit on the portion 16. This type of connection is desired in those instances where the bolt parts are of extremely hard metal such as stainless steel. It is clear in this embodiment that the portions 16 and 26a may be of a shape other than square as long as they are of corresponding shape, are non-round, and have dimensions providing for the press fit.

The bolt construction exemplified herein has the feature that virtually any lessor size of bolt shank diameter can be combined with virtually any larger size or shape of head and still accomplish a bolt construction that has the advantages of the cold heading process. In addition, the auxiliary head may be of a different metal or other material than that of the shank. The two parts of the bolt are readily joined by high speed, low cost press forming equipment and thus are economical to manufacture, the auxiliary head being readily made by stamping in a well known manner and capable of having any desired peripheral shape.

It is to be understood that the forms of my invention herein shown and described are to be taken as preferred examples of the same and that various other changes in the shape, size and arrangement of parts may be resorted to without departing from the spirit of my invention or the scope of the subjoined claims. For example, it is also understood that the invention may be applied to screw-type body members such as lag screws.

Having thus described my invention, I claim:
1. A bolt construction comprising,
   a. a body member having opposite ends,
   b. a head on one end of said body member having an undersurface,
   c. said body member having an unthreaded shank portion extending integrally from the undersurface of said head through a portion of the length of the body member,
   d. lateral projecting means on said unthreaded shank portion adjacent to the undersurface of said head,
   e. said body member having a threaded shank portion extending integrally from said unthreaded shank portion through the remaining portion of the body member,
   f. said projecting means extending laterally outwardly beyond the threaded surface of said threaded shank portion,
   g. an auxiliary bolt head having an upper surface,
   h. said auxiliary head having an axial opening larger in diameter than said threaded shank portion so as to receive the latter during construction of the bolt and smaller in diameter in at least a portion thereof relative to a lateral dimension of said projecting means,
   i. said auxiliary head having a non-rotatable securement on said body member with its upper surface in engagement against the undersurface of said bolt head by a forced penetration in an axial movement during bolt construction of said lateral projecting means into the portion of said auxiliary head that defines said axial opening in said auxiliary head,
   j. an inwardly swaged portion on a bottom portion of said auxiliary head around its axial opening grip- ping said body member and further locking said auxiliary head on said body member, k. said auxiliary head being of greater thickness than the length of said unthreaded shank portion so that said auxiliary head overlaps a portion of said threaded shank and said swaged portion grips in a portion of said threads, l. and a peripheral wrench-engaging surface on said auxiliary head arranged to receive a tool, whereby a turning force can be applied to the bolt.

2. The bolt construction of claim 1 wherein the volume of material in said auxiliary head is at least as great as the volume existing in said body member equivalent to the length along said body member of 4½ times its diameter.

3. The process of forming bolts comprising the step of securing in a non-rotatable fit an auxiliary head having an axial opening and an upper surface onto an unthreaded shank portion of a body member having a head and an unthreaded shank portion which extends from said head a predetermined distance along said shank portion, with the remainder of said shank portion being threaded to the end of the body member opposite from said head, said unthreaded shank portion having a laterally projecting portion of a dimension relative to the dimension of said opening such that the securement step is accomplished by moving said auxiliary head axially onto said unthreaded shank portion by a forced penetration of said lateral projecting means into the portions of said auxiliary head that define said axial opening in said auxiliary head to position its upper surface against and undersurface of said bolt head and a bottom portion of said auxiliary head in axially overlapping relationship with a portion of the threaded shank, and then swaging said auxiliary head inwardly at said bottom portion thereof into gripping engagement with said threads on said body member.

* * * * *